(12) United States Patent
Yang et al.

(10) Patent No.: US 8,766,559 B2
(45) Date of Patent: Jul. 1, 2014

(54) CONSTANT POWER LIMITER AND ILLUMINATION DEVICE HAVING SAME

(75) Inventors: Yonglian Yang, Guangdong (CN);
Baoning Deng, Guangdong (CN);
Xianfang Wang, Guangdong (CN);
Xiaoyong Dong, Guangdong (CN);
Jianwei Liu, Guangdong (CN)

(73) Assignee: Shenzhen H & T Intelligent Control Co., Ltd., Shenzhen, Guangdong (CN)

( * ) Notice: Subject to any disclaimer, the term of this patent is extended or adjusted under 35 U.S.C. 154(b) by 634 days.

(21) Appl. No.: 12/529,766

(22) PCT Filed: Apr. 25, 2008

(86) PCT No.: PCT/CN2008/070798
§ 371 (c)(1),
(2), (4) Date: Jun. 17, 2011

(87) PCT Pub. No.: WO2009/124433
PCT Pub. Date: Oct. 15, 2009

(65) Prior Publication Data
US 2011/0304278 A1  Dec. 15, 2011

(30) Foreign Application Priority Data
Apr. 8, 2008 (CN) .......................... 2008 1 0066462

(51) Int. Cl.
*H05B 37/02* (2006.01)
*G05F 1/00* (2006.01)

(52) U.S. Cl.
USPC ........... 315/307; 315/291; 315/308; 315/294; 315/297; 323/282

(58) Field of Classification Search
USPC ............. 315/291, 209 R, 294, 297, 307, 312; 323/282
See application file for complete search history.

(56) References Cited

U.S. PATENT DOCUMENTS

2003/0006710 A1* 1/2003 Black et al. .................... 315/138
2004/0218325 A1* 11/2004 Shih ............................. 361/93.1

* cited by examiner

*Primary Examiner* — Douglas W Owens
*Assistant Examiner* — Jonathan Cooper
(74) *Attorney, Agent, or Firm* — Jackson IPG PLLC

(57) ABSTRACT

A constant power limiter includes a control circuit and a power source circuit thereof, and the control circuit includes a voltage detection circuit configured for detecting a voltage of power source; a current detection circuit configured for detecting a load current; a zero-cross detection circuit configured for detecting a zero-cross point of AC power; a load driving circuit including a controlled silicon; and a micro control unit (MCU) configured for receiving output signals from the voltage detection circuit, the current detection circuit, and the zero-cross detection circuit, and outputting a control signal respectively to the load driving circuit to control a load power, wherein when the load power is less than or equal to a set power value, the load driving circuit has the controlled silicon fully open, when load power is no less than the set power value, the load driving circuit has the controlled silicon conduction angle decreased to stabilize the load power at the set power value.

8 Claims, 7 Drawing Sheets

CONSTANT POWER LIMITER AND ILLUMINATION DEVICE HAVING SAME

BACKGROUND OF THE INVENTION

1. Field of the Invention

The present invention relates to power-saving devices, particularly to a constant power limiter and illumination devices having such constant power limiters.

2. Description of the Related Art

Nowadays, due to the lack of energy, energy saving, environmental protection and waste eliminating have become a common global concern. For example, the United States has a clear limit about the power for lighting. In China, energy efficiency, reduced costs and improved resource utilization efficiency are of great significance for building a harmonious society and achieving a sustained, rapid and healthy development.

Therefore, it is necessary to design constant power limiter, which is installed in a lamp inside. If the load power exceeds a specified power, then the limiter automatically adjusts the load power within the specified range.

What is needed, therefore, is a constant power limiter that can overcome the above-described deficiencies. What is also needed is an illumination device has such a constant power limiter.

SUMMARY OF THE INVENTION

It is an object of the present invention to provide a constant power limiter that can limit load power in a set power range.

It is another object of the present invention to provide a illumination device including a constant power limiter that can limit load power in a set power range.

In one exemplary embodiment of the present invention is a constant power limiter includes a control circuit and a power source circuit thereof, and the control circuit includes a voltage detection circuit configured for detecting a voltage of power source; a current detection circuit configured for detecting a load current; a zero-cross detection circuit configured for detecting a zero-cross point of AC power; a load driving circuit including a controlled silicon; and a micro control unit (MCU) configured for receiving output signals from the voltage detection circuit, the current detection circuit, and the zero-cross detection circuit, and outputting a control signal respectively to the load driving circuit to control a load power, wherein when the load power is less than or equal to a set power value, the load driving circuit has the controlled silicon fully open, when load power is no less than the set power value, the load driving circuit has the controlled silicon conduction angle decreased to stabilize the load power at the set power value.

In another exemplary embodiment of the present invention is an illumination device includes a lamp and a constant power limiter connected with the lamp, constant power limiter including a control circuit and a power source circuit thereof, and the control circuit includes a voltage detection circuit configured for detecting a voltage of power source; a current detection circuit configured for detecting a load current; a zero-cross detection circuit configured for detecting a zero-cross point of AC power; a load driving circuit including a controlled silicon; and a micro control unit (MCU) configured for receiving output signals from the voltage detection circuit, the current detection circuit, and the zero-cross detection circuit, and outputting a control signal respectively to the load driving circuit to control a load power, wherein when the load power is less than or equal to a set power value, the load driving circuit has the controlled silicon fully open, when load power is no less than the set power value, the load driving circuit has the controlled silicon conduction angle decreased to stabilize the load power at the set power value.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
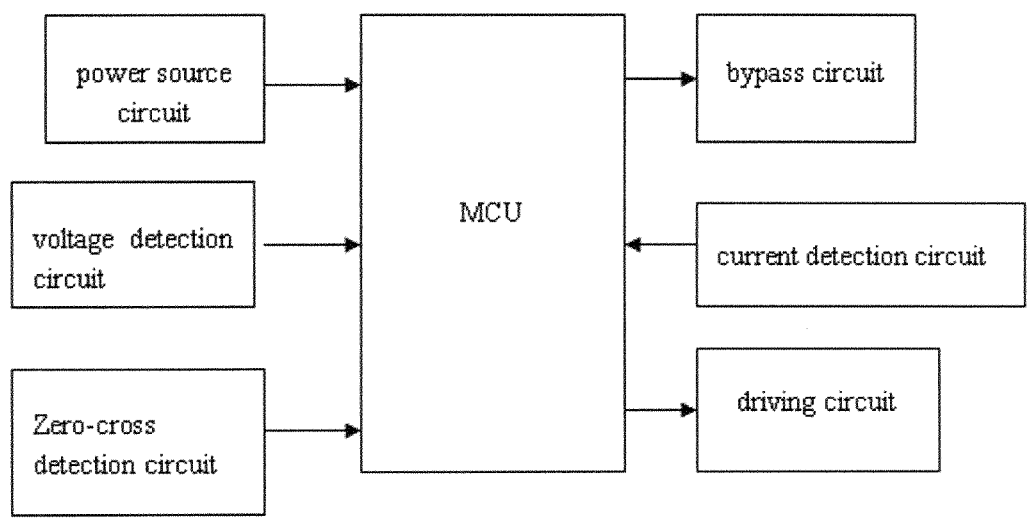
FIG. 1 is a block diagram of a constant power limiter according to an exemplary embodiment of the present invention.

Referring to FIG. 1, a block diagram of a constant power limiter according to an exemplary embodiment is shown. The constant power limiter includes a power source circuit and a control circuit powered by the power source circuit. The control circuit includes a voltage detection circuit configured for detection a power source voltage from the power source circuit, a current detection circuit configured for detecting a current flowing thereof, a zero-cross driving circuit configured for detecting a zero-cross point of an AC power supplied to a load, a load driving circuit, and an MCU (micro control unit) configured for receiving signals from the voltage detection circuit, the current detection circuit and the zero-cross detection circuit, and outputting control signals to the load driving circuit so as to control the power of the AC power. The constant power limiter further includes a bypass circuit connected to an output terminal of the MCU and configured for bypassing the AC power when the control circuit has a breakdown. In this case, when the control circuit has any components such like one or more of the voltage detection circuit, the current detection circuit, the zero-cross detection circuit, the load driving circuit and the MCU being in breakdown, the bypass circuit automatically functions so that the electrical devices can still work only without power limitation function. However, if the power limiter is out of work, the electrical devices have the power supply being cut off and cannot work normally.

Figure 2:
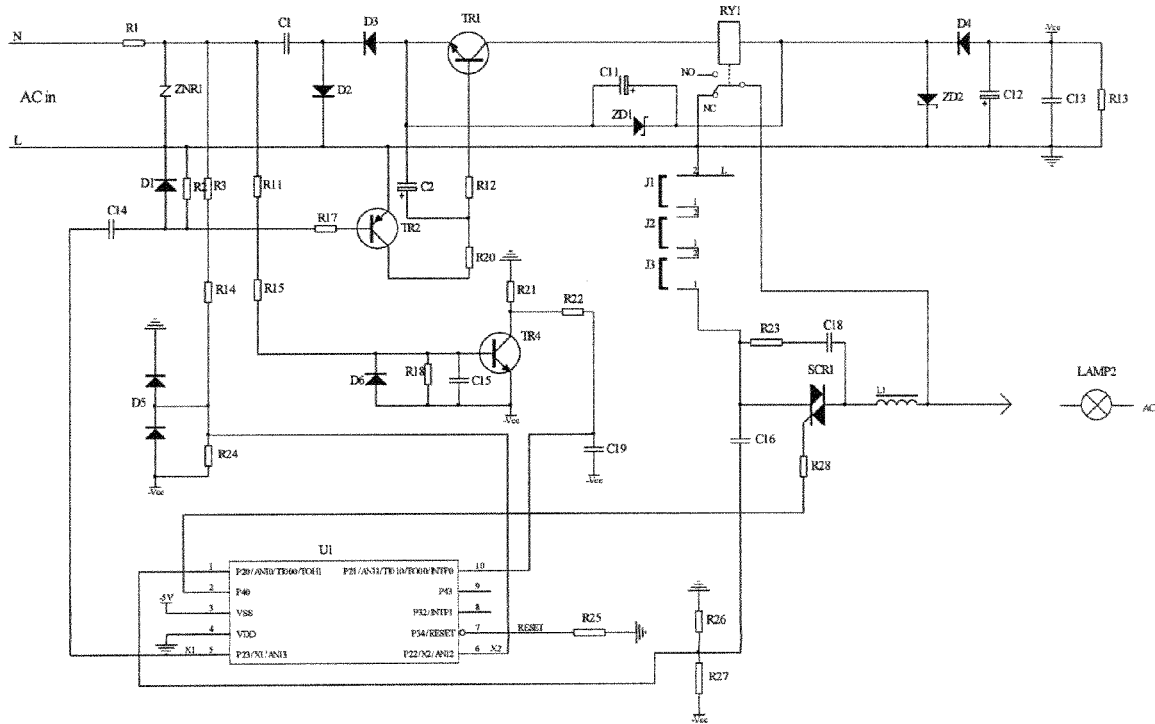
FIG. 2 is a circuit diagram of a constant power limiter according to an alternative embodiment of the present invention, the constant power limiter including a power source circuit, a voltage detection circuit, a current detection circuit, a zero-cross detection circuit, a relay driving circuit, and a silicon control driving circuit.

Referring to FIG. 2, a circuit diagram of a constant power limiter according to an alternative embodiment is shown. In the illustrated embodiment, the bypass circuit includes a relay RY1 and a switch control circuit. The switch control circuit includes triodes TR1 and TR2. The load driving circuit includes controlled silicon serially connected thereto, and the controlled silicon has a control terminal connected to the output terminal of the MCU U1. The working principle is, the MCU calculates the power of the load by detecting power supply voltage and load current, and controls the load power by adjusting the conduction angle of controlled silicon to achieve the purpose of power limit.

When the load power is less than or equal to a set power, the controlled silicon is fully open. When the load power is greater than the set power, the conduction angle of the controlled silicon decreased, so that the average current flowing through the load decreases, and according to P=UI, the load power is correspondingly smaller. While the conduction angle is decreased as well as detecting the feedback current signal, when the load power reaches the set value, keeping the current conduction angle unchanged, so that the load power maintains stable at set power value. The constant power limiter has the bypass circuit using normally closed contact of the relay. Under normal circumstances, the relay is pulled in and the normally closed contact is disconnected. That is normally closed contact is broken and the bypass circuit is not working. When the controller does not work, the relay releases, and normally closed contact is closed. The load current through the normally closed contact constitutes a complete circuit to ensure the normal power supply for lamps.

The power source circuit, the voltage detection circuit, the current detection circuit, zero-cross detection circuit, the relay driving circuit and the controlled silicon driving circuit shown in FIG. 2 are described in detail as following.

Figure 3A:
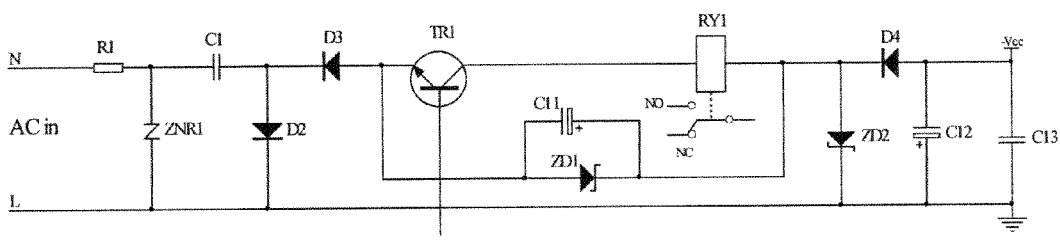
FIG. 3A is a circuit diagram of the power source circuit of the constant power limiter shown in FIG. 2.

Referring to FIG. 3A, the power source has an RC step-down circuit and for the power source circuit, there are two loads: the relay and Vcc. The relay and Vcc is serially connected having the advantage of reduced capacitance of capacitors. Because the RC step-down circuit is a constant current source, when part or whole loads not in operation, the current flows away from the voltage regulator, such that the greater capacitance is, the greater the static power is. Assuming the relay needs a current I1, the Vcc needs a current I2, and I2 is greater than I1, and the capacitor can provide a current I0, thus when selecting the capacitance of the capacitor, only the condition that I0>I2 needs to be considered, thereby having a reduced cost and volume of the capacitor and low power consumption.

When the relay needs to be pulled in, the triode TR1 is switched on. The current flows through windings of the relay RY1. When the relay needs to release, the triode TR1 is switched off, no current flows through windings of the relay RY1, and the current flows the voltage regulator ZD1 constituting a complete circuit.

Figure 3B:
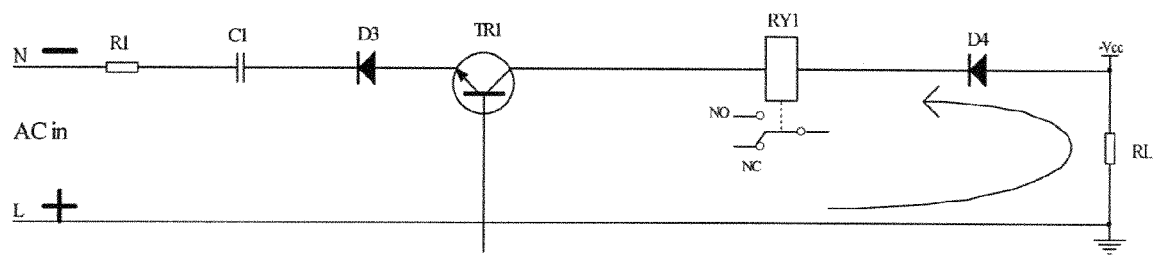
FIG. 3B is a circuit diagram of the power source circuit showing a current flow direction when relay is pulled in during negative half cycle of power source shown in FIG. 3A.
Figure 3C:
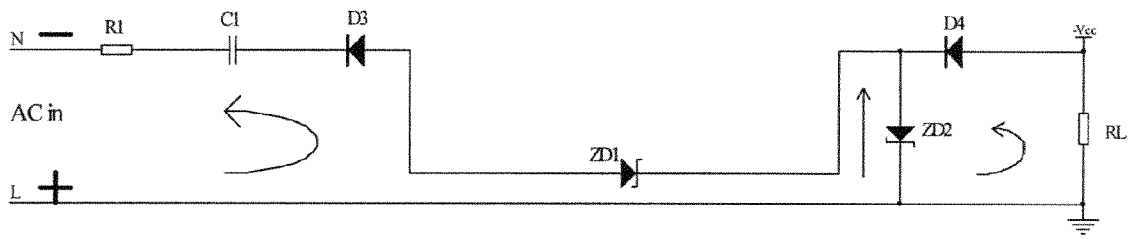
FIG. 3C is a circuit diagram of the power source circuit showing a current flow direction when relay releases during negative half of power source shown in FIG. 3A.
Figure 3D:
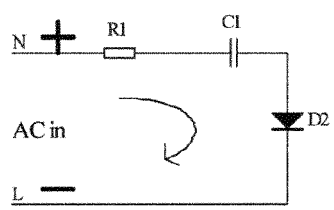
FIG. 3D is a circuit diagram of the power source circuit showing a current direction during positive half cycle.

Referring to FIG. 3B, this shows a circuit diagram of the power source circuit showing a current flow direction when relay is pulled in during negative half cycle of power source shown in FIG. 3A. Referring to FIG. 3C, this shows a circuit diagram of the power source circuit showing a current flow direction when relay releases during negative half of power source shown in FIG. 3A. Referring to FIG. 3D, this shows is a circuit diagram of the power source circuit showing a current direction during positive half cycle.

Figure 4A:
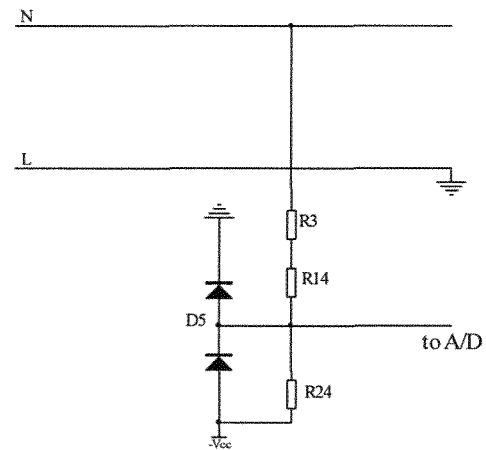
FIG. 4A is a circuit diagram of the voltage detection circuit shown in FIG. 2.

Referring to FIG. 4A, this shows a circuit diagram of the voltage detection circuit shown in FIG. 2. Because the RC step-down circuit is non-isolated, the AC power can be directly divided by a resistor and the divided voltage is sent to an A/D terminal of the MCU. The MCU detects the voltage of the AC power according to a amplitude of signals. The diode D5 is served as a clamping diode, which keeps the signals applied to the A/D terminal of the MCU is within a safe range scan and the MCU is not damaged.

Figure 5A:
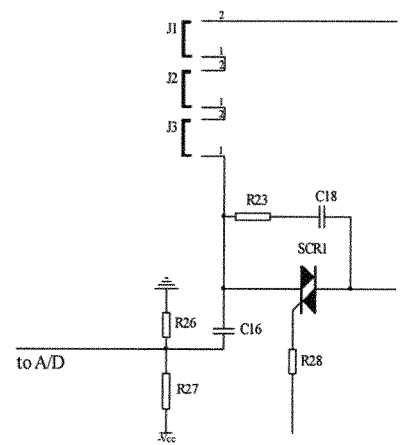
FIG. 5A is a circuit diagram of the current circuit shown in FIG. 2.

Referring to FIG. 5A, this shows a circuit diagram of the current circuit shown in FIG. 2. In the illustrated embodiment, J1, J2 and J3 are constantan wires, the resistances of which can be changed by changing length and diameter thereof. When the controlled silicon SCR1 is turned on, the AC power goes through the lamp, the controlled silicon, J1, J2, and J3 reaching the other end of the AC power. The constantan wires are serially connected in the load power supply circuit, having resistances used for dividing voltage. A voltage drop in the constantan wires varies with the current, and the voltage signal having the power frequency is applied to the A/D terminal of the MCU after coupled by the capacitor C16. The MCU can detect the current flowing through the load according to the voltage signal. The resistors R26, R27 are configured for stabilizing the datum point of the signal couple by the capacitor C16.

Figure 6A:
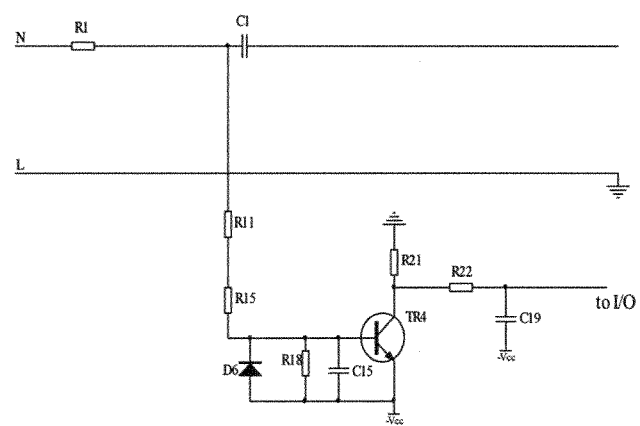
FIG. 6A is a circuit diagram of the zero-cross detection circuit shown in FIG. 2.

Referring to FIG. 6A, this is a circuit diagram of the zero-cross detection circuit of the constant power limiter shown in FIG. 2. The zero-cross detection circuit adopts dropping resistors and rectifying triodes.

Figure 7:
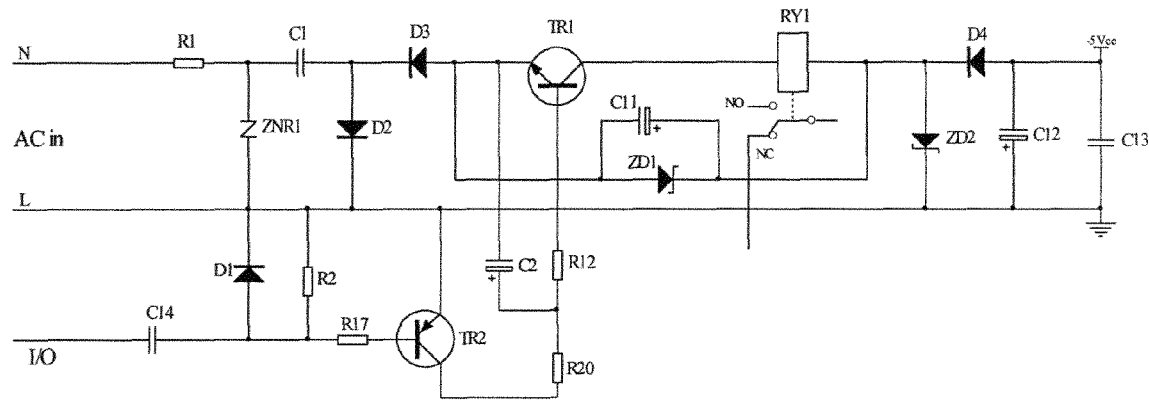
FIG. 7 is a circuit diagram of the relay driving circuit shown in FIG. 2.

Referring to FIG. 7, this shows a circuit diagram of the relay driving circuit shown in FIG. 2. During a negative half cycle, the relay needs to be operated, and a control terminal I/O outputs a pulse signal. The pulse signal is coupled by the capacitor C14, the resistor R17 and then applied to a base of the triode TR2, thus the triode TR2 is switched on during the negative half cycle of the pulse signal. The current flows from an emitter of the triode TR2 to a collector of the triode TR2 and further flows through the resistor R20 charging the capacitor C2. Meanwhile, the current flows through the resistor R12 to a base of the triode TR1, such that the triode TR1 is switched on. The relay RY1 has current flowing through windings thereof, and the relay RY1 is pulled in, and the capacitor C11 is charged. During a positive half cycle of the pulse signal, the capacitor C14 discharges through the diode D1, thereby the triode TR2 being switched off. The capacitor C2 provides a current to the base of the triode TR1 through the resistor R12, thereby the triode TR1 maintaining on-state and the relay maintaining pulled in. The resistor R2 is a pull-up resistor in order to ensure that the triode TR2 is at off-state when no control signal being applied.

During the positive half cycle, the current of power source flows through the diode D2 directly. The capacitor C11 discharges through the relay RY1 and the triode TR1, and the relay RY1 maintains pulled in.

When the relay needs not to be pulled in, the control terminal has no pulse signal outputted, and the triodes TR2 and TR1 are switched off. When in normal operation, the MCU sends signal to make the relay to be pulled in, and when the MCU has a breakdown, the relay is released automatically.

Referring to FIG. 2, this shows a circuit diagram of the controlled silicon of the constant power limiter shown in FIG. 2. In the illustrated embodiment, the I/O terminal of the MCU directly drives the controlled silicon. When the controlled silicon needs not to be turned on, the I/O terminal has a high level voltage output; when the controlled silicon needs to be turned on, the I/O terminal has a low level voltage output. The MCU receives and calculates the voltage signal and the current signal and then adjusts the conduction time of the controlled silicon so as to achieve the purpose of load power limit.

Figure 4B:
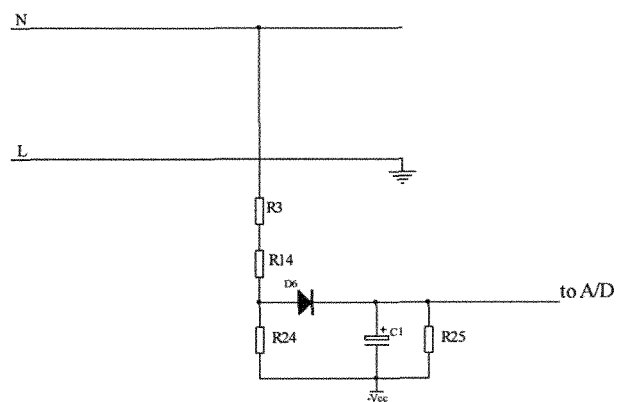
FIG. 4B is a circuit diagram of a voltage detection circuit of a constant power limiter according to an alternative embodiment of the present invention.

The voltage detection circuit, the current detection circuit, the zero-cross detection circuit, the load driving circuit, and the bypass circuit can also have alternative embodiments. For example, referring to FIG. 4B, a voltage detection circuit according to an alternative embodiment of a constant power limiter of the present invention is shown. The resistors R3, R14, R24 constitute a voltage dividing circuit. During the positive half cycle, the diode D6 is conducted, and the capacitor C1 is charged. The capacitor C1 has a voltage thereof changes with the voltage of power source. Thus the MCU can receives the voltage of the capacitor C1 directly to detect the voltage of the power source. The resistor R35 is used as discharging resistor for the capacitor C1.

Figure 5B:
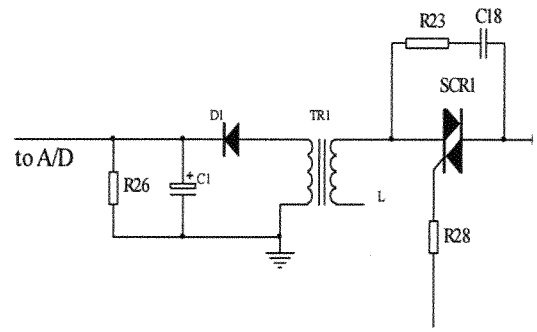
FIG. 5B is a circuit diagram of a current detection circuit of a constant power limiter according to an alternative embodiment.

Referring to FIG. 5B, a current detection circuit of a constant power limiter according to an alternative embodiment of the present invention is shown. The TR1 is a current transformer. The load current flows through the primary windings and an induced electromotive force is generated in the secondary windings, which charges the capacitor C1 through the diode D1. The voltage of the capacitor C1 is in proportion with the load current. The MCU receives the voltage of the capacitor C1 to detect the load current. The resistor R26 is used as a discharging resistor for the capacitor C1.

Figure 6B:
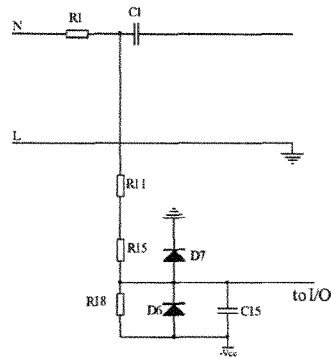
FIG. 6B is a circuit diagram of a zero-cross detection circuit of a constant power limiter according to an alternative embodiment.

Referring to FIG. 6B, a circuit diagram of a zero-cross circuit of a constant power limiter according to an alternative embodiment of the present invention. The MCU has a zero-cross detection terminal connected to the zero-cross detection circuit via a divider resistor. Such zero-cross detection circuit is low in cost while easy to be interfered.

Figure 8A:
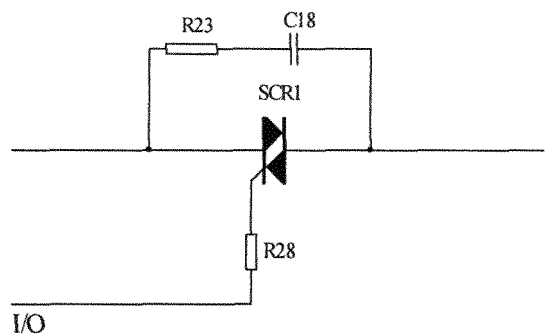
FIG. 8A is a circuit diagram of the controlled silicon driving circuit shown in FIG. 2.
Figure 8B:
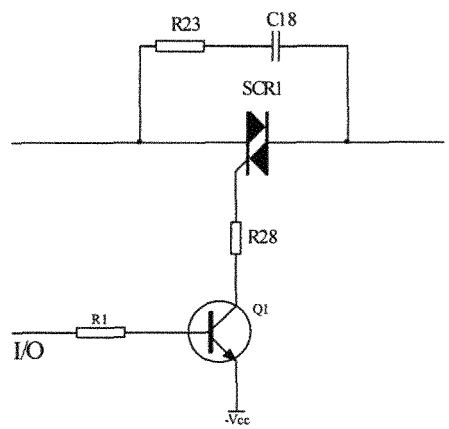
FIG. 8B is a circuit diagram of a controlled silicon driving circuit of a constant power limiter according to an alternative embodiment of the present invention.

Referring to FIG. 8B, a controlled silicon driving circuit of a constant power limiter according to an alternative embodiment of the present invention is shown. The control signal from the I/O terminal is reversed by Q1 and then turns on the controlled silicon.

Furthermore, when using the controlled silicon, the sine wave is cut and the waveform is distorted, and some circuits for interfere reducing can be added for optimum. For example, an inducer can from behind connect the controlled silicon shown in FIG. 2.

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A constant power limiter comprising a control circuit and a power source circuit thereof, wherein the control circuit comprises:
    a voltage detection circuit configured for detecting a voltage of power source;
    a current detection circuit configured for detecting a load current;
    a zero-cross detection circuit configured for detecting a zero-cross point of AC power;
    a load driving circuit comprising a controlled silicon;
    a micro control unit (MCU) configured for receiving output signals from the voltage detection circuit, the current detection circuit, and the zero-cross detection circuit, and outputting a control signal respectively to the load driving circuit to control a load power, wherein when the load power is less than or equal to a set power value, the load driving circuit has the controlled silicon fully open, when load power is no less than the set power value, the load driving circuit has the controlled silicon conduction angle decreased to stabilize the load power at the set power value; and
    a bypass circuit connected to an output terminal of the MCU, which is configured for functioning when the control circuit has a breakdown,
    wherein the bypass circuit comprises a relay and a switch circuit, the relay has a moving contact and a fixed contact serially connected in the circuit, the switch circuit being configured for receiving the control signal from the MCU and control the relay to be pulled in or released according to the control signal.

2. The constant power limiter as claimed in claim 1, wherein the controlled silicon is serially connected in a load power supply circuit having a control terminal connecting the output terminal of the MCU.

3. The constant power limiter as claimed in claim 1,
    wherein the relay has a normally closed contact connected to an input terminal of the AC power, and a moving contact connected to an input terminal of power supply of the load.

4. The constant power limiter as claimed in claim 3,
    wherein the power source circuit is an RC step-down circuit, the power source circuit has two loads: the relay and Vcc, and the relay and the Vcc are serially connected.

5. An illumination device comprising a lamp and a constant power limiter connected with the lamp, the constant power limiter comprising a control circuit and a power source circuit, the control circuit comprising:
    a voltage detection circuit configured for detecting a voltage of power source;
    a current detection circuit configured for detecting a load current;
    a zero-cross detection circuit configured for detecting a zero-cross point of AC power;
    a load driving circuit comprising a controlled silicon;
    a micro control unit (MCU) configured for receiving output signals from the voltage detection circuit, wherein the current detection circuit, and the zero-cross detection circuit, and output a control signal respectively to the load driving circuit to control a load power, wherein when the load power is less than or equal to a set power value, the load driving circuit has the controlled silicon fully open, when load power is no less than the set power value, the load driving circuit has the controlled silicon conduction angle decreased to stabilize the load power at the set power value; and a bypass circuit connected to an output terminal of the MCU, which is configured for functioning when the control circuit has a breakdown;

wherein the bypass circuit comprises a relay and a switch circuit, the relay has a moving contact and a fixed contact serially connected in the circuit, the switch circuit being configured for receiving a control signal from the MCU and control the relay to be pulled in or released according to the control signal.

6. The illumination device as claimed in claim 5, wherein the controlled silicon is serially connected in a load power supply circuit having a control terminal connecting the output terminal of the MCU.

7. The constant power limiter as claimed in claim 1, wherein the controlled silicon is serially connected in a load power supply circuit having a control terminal connecting the output terminal of the MCU.

8. The illumination device as claimed in claim 5, wherein the controlled silicon is serially connected in a load power supply circuit having a control terminal connecting the output terminal of the MCU.

* * * * *